UNITED STATES PATENT OFFICE.

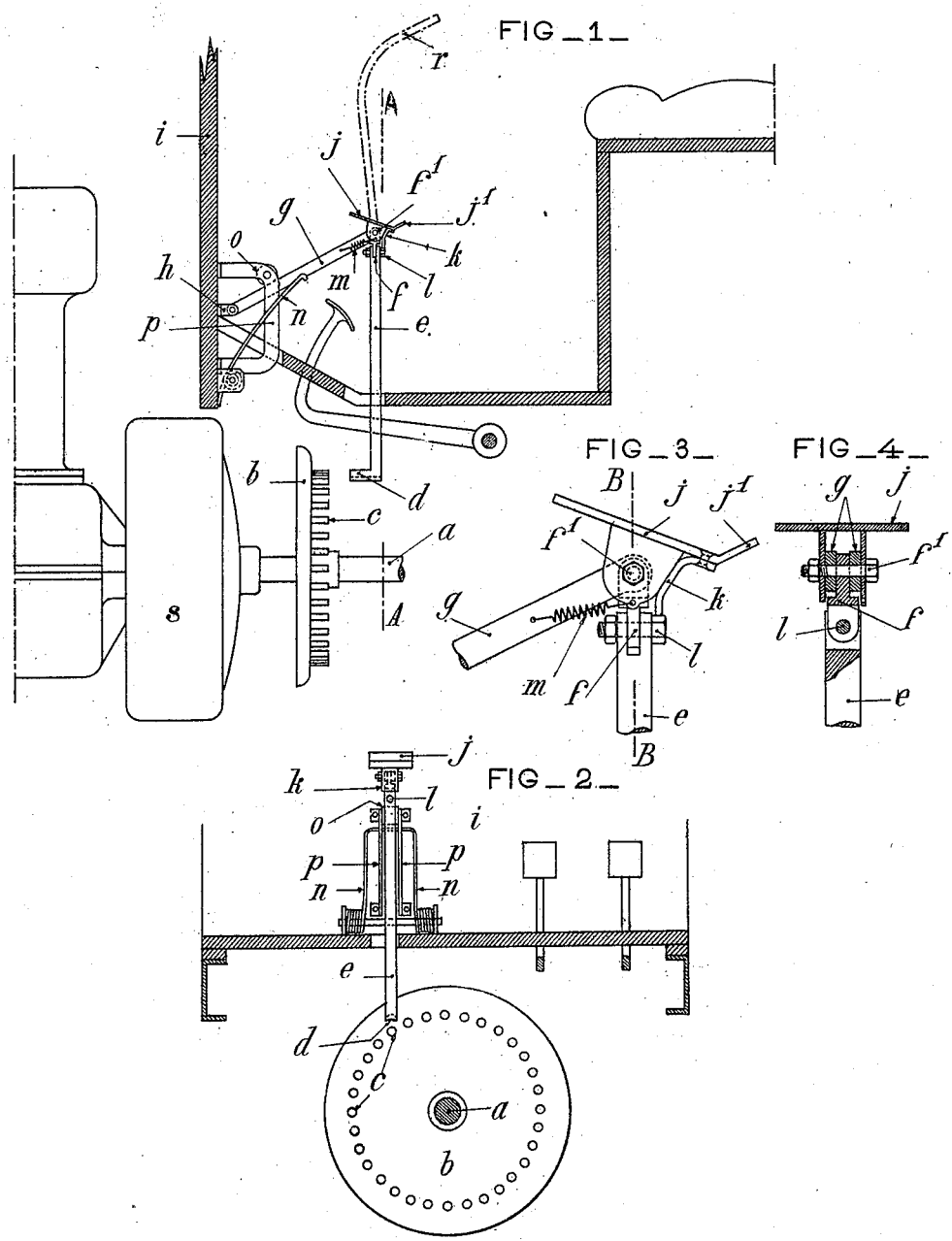

ALPHONSE EDOUARD GARNIER, OF PARIS, FRANCE.

STARTING DEVICE FOR MOTOR-VEHICLES.

952,800.  Specification of Letters Patent.  Patented Mar. 22, 1910.

Application filed December 7, 1909. Serial No. 531,842.

*To all whom it may concern:*

Be it known that I, ALPHONSE EDOUARD GARNIER, a citizen of France, residing at 37 Rue de Chaillot, Paris, in the Republic of France, have invented new and useful Improvements in Starting Devices for Motor-Vehicles, of which the following is a specification.

This invention relates to a device for enabling the driver to start the engine of an automobile without leaving his seat.

This device essentially comprises a special pedal or a hand lever which allows a pivoted lever to be brought into contact with the teeth of a lantern wheel or the like keyed on the engine shaft, in such manner as to cause this wheel to move through a fraction or successive fractions of a revolution, thus causing rotation of the engine shaft and consequently the starting of the engine.

In the annexed drawings which illustrate the invention by way of example, Figure 1 is a sectional elevation. Fig. 2 is a section on the line A—A of Fig. 1. Figs. 3 and 4 show to enlarged scale the mounting of the pedal, Fig. 4 being a section on the line B—B of Fig. 3.

As shown, on the engine shaft $a$ is keyed a disk $b$ carrying pins $c$ on which operates the finger $d$ of a lever $e$ mounted through the medium of a Cardan joint $f$ and an axle $f^1$ at the end of a pedal $g$ pivoted in a hinge $h$ fixed to the dash-board $i$ of the vehicle. In the position of rest the lever $e$ hangs freely slightly to the rear of the disk $b$, so as not to impede the movements of the disk $b$ during withdrawal of the clutch. The block $j$ of the pedal is pivoted at the end of the arm $g$ and has a flange $j^1$ and an abutment $k$ adapted to bear on a projection on the lever $e$ (the head of the bolt $l$, for instance as shown in the drawing). A spring $m$ always brings the abutment $k$ into contact with the head of the bolt $l$. Another spring $n$, is secured at one end to the dash-board $i$. This spring is formed of two side coils connected by a bridge part on which bears the pedal $g$ so that the coils of the spring work by winding when said pedal is acted upon. The spring $n$ supports, by means of the pedal $g$, all the moving part and always returns it to its upper position for which purpose the arm of the pedal $g$ bears on a rubber ring $o$ mounted between two supports $p$ secured to the dash board and forming guides for the said arm $g$.

The lower surface of the finger $d$ is made concave in order to avoid any sliding movement during the action of this latter on the pins $c$ and its upper surface is curved, that is to say made convex in order to prevent it from becoming wedged between two pins. The opening for the passage of the lever $e$ in the floor of the vehicle is of the necessary dimensions and form for permitting only the movement required by the operation of the said lever. This is therefore guided and can only move a very little from its normal position whatever be the inclination of the vehicle.

If the driver desires to start the engine from his seat he first presses with his foot on the flange $j^1$ on the pedal block $j$. This then turns about the axis $f^1$ and pushes forward by means of its abutment $k$, the lever $e$ whose finger $d$ places itself above one of the pins $c$. If the driver then presses on the pedal, the finger $b$ rests on the pin $c$ above which it is situated, and, acting on this, moves the disk $b$ thus turning the engine shaft $a$. In this movement, the pedal $g$ turns about its hinge $h$ and the lever $e$ is depressed at an angle owing to its universal connection $f$, so that, during the whole of the descending movement the finger $d$ remains in contact with the same pin $c$. When the finger $d$ reaches the lower side of the lantern wheel, the pedal $j$ is just resting on the floor of the vehicle. The driver then ceases to depress the pedal and the whole of the moving device rises, taking up its original position again under the action of the springs $m$ and $n$. The engine shaft is therefore caused to move through about a third of a revolution by depression of the pedal.

As shown in Fig. 1 in dotted lines a lever $r$ for effecting the starting may be substituted for the pedal. If there is not sufficient space on the engine shaft $a$ the disk $b$ may be dispensed with and the pins $c$ mounted on the fly-wheel $s$ of the engine.

Having now described my invention, what I claim as new and desire to secure by Letters Patent is:

1. A starting device for motor vehicles comprising in combination a disk keyed on the engine shaft, pins fixed on said disk according to a circle, a lever pivoted on the body of the vehicle, a depending arm pivoted on said lever and adapted to come in engagement with the pins of the disk, and a spring acting upon said lever, substantially as described and for the purpose set forth.

2. A starting device for motor vehicles comprising in combination a disk keyed on the engine shaft, pins fixed on said disk according to a circle, a lever pivoted on the dash-board of the vehicle, a depending arm mounted through the medium of a Cardan joint on said lever, a finger formed at the free end of said depending arm and having its lower surface concave and its upper surface convex, and a spring formed of two side coils connected by a bridge part on which the said lever is adapted to bear, substantially as described and for the purpose set forth.

3. A starting device for motor vehicles comprising in combination a disk keyed on the engine shaft, pins fixed on said disk according to a circle, a lever pivoted on the dash-board of the vehicle, a pedal block pivoted at the free end of said lever, a spring having its ends fixed respectively to said lever and said block, a flange formed on said block, a depending arm mounted on said lever through the medium of a Cardan joint, an abutment fixed on the pedal block and adapted to bear on a projection of said depending arm, a finger formed at the end of said depending arm and adapted to come in engagement with the pins of the disk, and a spring tending to raise normally the lever with its depending arm, substantially as described and for the purpose set forth.

In testimony whereof I have signed my name to this specification in the presence of two subscribing witnesses.

ALPHONSE EDOUARD GARNIER.

Witnesses:
 LOUIS MOSES,
 H. C. COXE.